Patented July 29, 1941

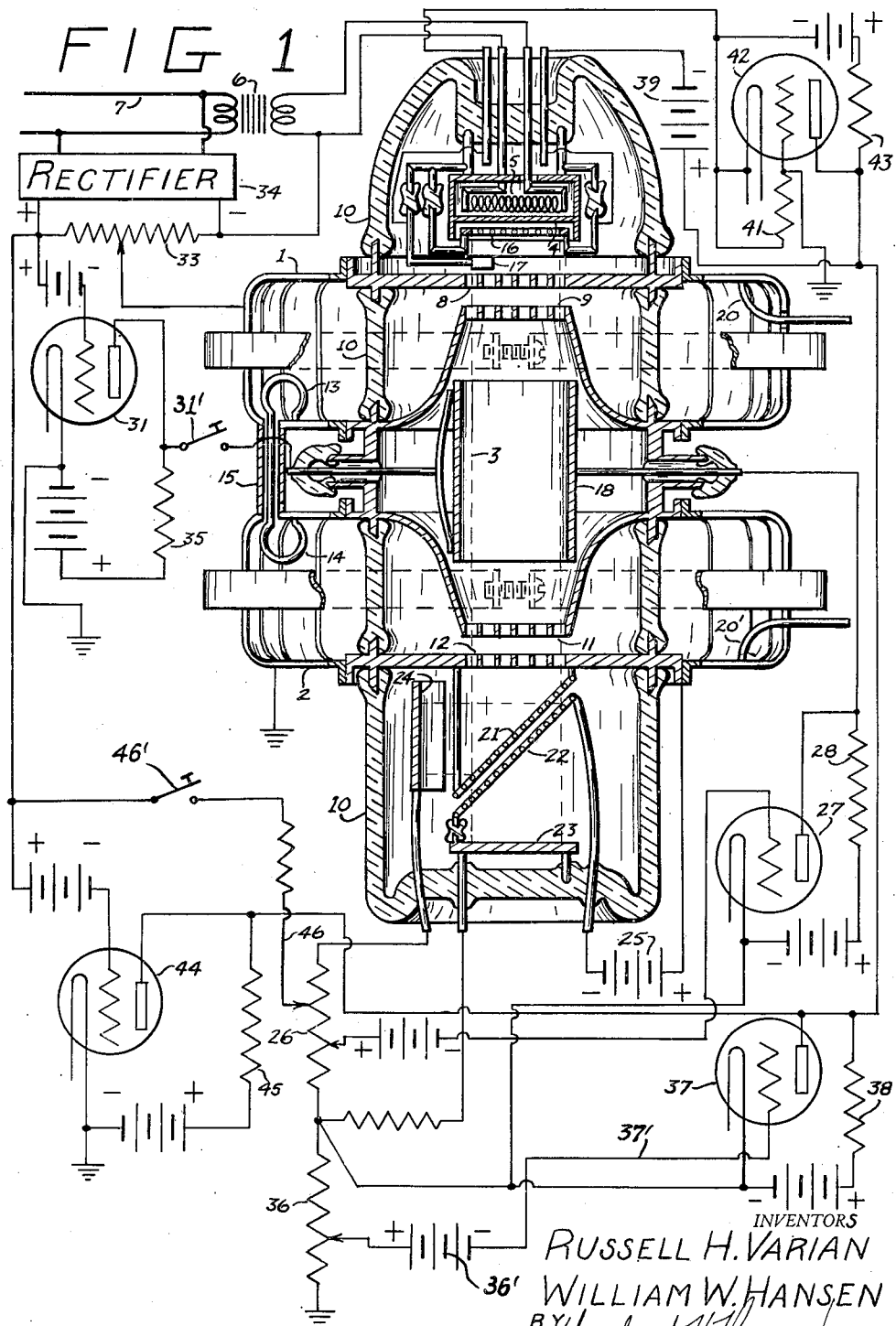

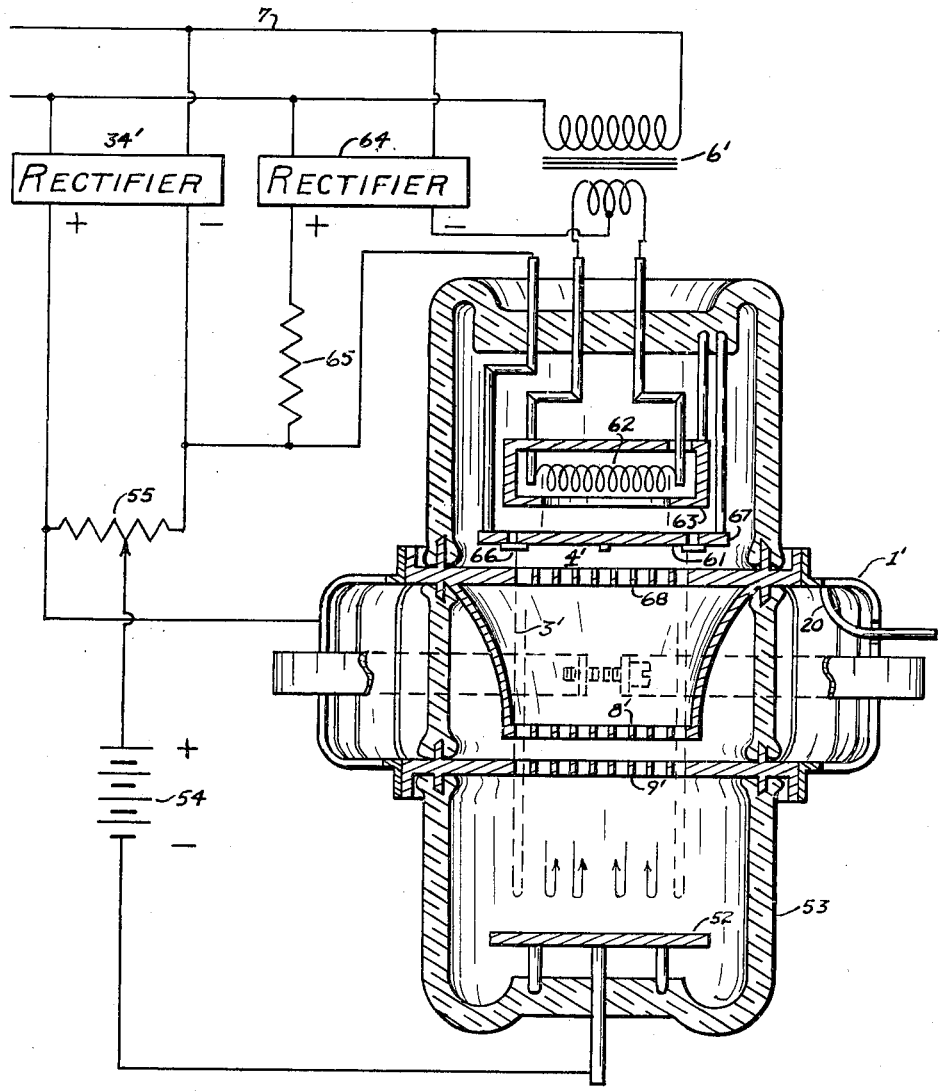

2,250,511

UNITED STATES PATENT OFFICE 2,250,511

OSCILLATOR STABILIZATION SYSTEM

Russell H. Varian and William W. Hansen, Stanford University, Calif., assignors to The Board of Trustees of The Leland Stanford University, Stanford University, Calif., a corporation of California Application September 2, 1938, Serial No. 228,133

10 Claims. (Cl. 250—36)

This invention relates generally, to the stabilization of the operation frequency of electromagnetic oscillators, and the invention has reference, more particularly to frequency stabilization of electron beam oscillators of the type disclosed in the application Ser. No. 168,355, R. H. Varian, Electrical converter, filed Oct. 11, 1937.

In copending applications Ser. No. 92,787 of W. W. Hansen, filed July 27, 1936, Patent No. 2,190,712, granted February 20, 1940; Ser. No. 185,382, R. H. Varian and W. W. Hansen, filed Jan. 17, 1938; Ser. No. 201,898, R. H. Varian and W. W. Hansen, filed April 14, 1938; and Ser. No. 215,639, R. H. Varian, filed June 24, 1938, there are described a number of embodiments of related inventions which have come to be known by the names "rhumbatron," "klystron," "buncher," "catcher," and "reflex klystron." These names are used in the present specification and may be defined as follows: i. e. "rhumbatron" is a cavity resonator, i. e., a resonant circuit characterized by an electromagnetic field bounded by a substantially electrically closed conducting surface, energy being transferred to or from the electromagnetic field by inductive loops or capacitive elements in the field or by radiation through an opening in the conducting surface or by a beam of electrons projected through the field. "Klystron" is an electrical converter or amplifier composed of two or more cavity resonators excited and coupled by a beam of electrons projected through the fields contained in the resonators. "Buncher" is that cavity resonator of a "klystron" nearest the emitter of the electron beam, and in which the electrons are alternately accelerated and decelerated at the frequency of oscillation of the apparatus. "Catcher" is that cavity resonator in a "klystron" farthest from the emitter of the electron beam, and in which energy of the bunched electron beam is converted into electromagnetic field energy. "Reflex klystron" is an oscillator or amplifier using but one cavity resonator which acts as both "buncher" and "catcher," an electron beam being projected through the cavity resonator in one direction and reflected back into the cavity resonator by an additional electric field outside the resonator.

The principal object of the present invention is to stabilize the operation frequency of electron beam oscillators by providing methods and means to stabilize the time consumed in the flight of electrons between "buncher" and "catcher" and to stabilize the velocities and densities of electron beams used in apparatus of the kind described, and to thereby minimize the disturbing effects of voltage and current variation in the beams at the frequency of operation of the apparatus.

Another object of the invention is to produce methods and means of detecting variations of voltage in electron beams and of compensating for such variations, and also to produce methods and means of detecting variations of current in electron beams and of compensating for such variations.

Still another object of the invention is to produce means for emitting electrons having a high degree of stability of emission current.

Other objects and advantages will become apparent from the specification, taken in connection with the accompanying drawings wherein the invention is embodied in concrete form.

In the drawings,

Fig. 1 is a circuit diagram of the stabilization system of the present invention.

Fig. 2 is a diagram of a somewhat modified construction.

Similar characters of reference are used in all of the above figures to indicate corresponding parts.

The present invention is related to that disclosed in copending application Ser. No. 215,639 and the objects of both inventions are largely similar, but the present invention operates on entirely different principles from the former and is different structurally therefrom. In Ser. No. 215,639 an oscillator is used with an auxiliary oscillator with different frequency characteristics and phase differences are developed between the oscillations of the two oscillators, which are used to control the frequency. In that system the frequency is stabilized with almost no variation, and the phase difference between two oscillators is allowed to take any stable value. In the present invention the frequency may or may not be held to a constant value, and no auxiliary oscillator is used. The stabilization is accomplished by correcting the parameters or conditions that ordinarily cause departures from the desired frequency of the system. Of these parameters, changes in voltage on the heater of the electron emitter, and change of voltage used for electron beam acceleration are the principal disturbing factors in apparatus of the kind most directly concerned.

There are already known in the art various methods of correcting or regulating the voltage of a line, and, of course, these methods can be applied to the current supply of the apparatus, but under some conditions the existing methods of direct voltage control are not convenient or practicable to use. For instance, it may not be feasible to accomplish sufficiently accurate regulation of voltage to avoid some variation of electron emission, and in such cases it is preferable to control the electron beam directly for correction of this condition. The methods and means of the present invention and that of Ser. No. 215,639 may be used simultaneously if the utmost obtainable stability is desired.

In Fig. 1 there is shown a "klystron" or velocity grouped electronic device together with appurtenances especially applicable to this invention. In this figure a buncher cavity resonator or resonant circuit member 1, and a catcher resonant circuit member 2, are shown excited by an electron stream or beam 3 produced by an electron emitter 4, suitable sealing means 10 being provided for surrounding the beam to provide an evacuated path therefor. Emitter 4 may be of the active oxide type heated by a filament 5 connected to any convenient source of energy, in this instance a transformer 6 and of power line 7. Circuit member 1 is provided with spaced grids 8 and 9, while circuit member 2 has spaced grids 11 and 12. Resonant circuit members 1 and 2 are electromagnetically coupled by loops 13 and 14 interconnected by a line 15 preferably of concentric non-radiating form. Between the emitter 4 and circuit member 1 there is positioned a control grid 16 and a beam sampling electrode 17. A conducting tube 18 extends intermediate members 1 and 2 through which tube the electron beam 3 passes. The grid 16, sampling electrode 17, and tube 18 are selectively subject to varied use depending upon the details of the method of stabilization employed, as will further appear. Beyond grid 12 there are provided inclined detector grids 21 and 22 and detector plates 23 and 24 shown as at right angles to one another. These detector elements are similar to that described for detection in Ser. No. 218,064, filed July 8, 1938. Two loops 20 and 20' are provided for coupling energy into or out of members 1 and 2, either or both of which loops may be used.

The electron beam current is controlled in part by the space charge of control grid 16, and the average electron velocity between resonators 1 and 2 by the action of conducting tube 18. Grid 16 can be controlled by variations in electron beam current within the apparatus or by variations in line voltage outside the apparatus. Similarly, tube 18 can be controlled either by internal variations in electron velocity, or by external variations in line voltage. Thus it is that the methods of stabilization herein described are of two types, the first of which may be referred to as a method of internally excited compensation and the second as a method of externally excited compensation. Where reference is made to electron or electron beam velocity compensation, it will be understood that it is time of flight of the electrons between circuit members 1 and 2 that is actually important. Stabilization of time of flight, however, is necessarily effected through changes in velocity.

In the operation of the system, oscillations are produced by the bunching of electrons in beam 3 through the operation of circuit member 1 and the catching of or energy absorption from electrons in circuit member 2 as has been explained before in copending application Ser. No. 168,355. Electrons emerge from grid 12 of circuit member 2 with varying velocities and they later enter the field between grids 21 and 22. Grid 22 is negatively polarized by a battery 25 so that the slower electrons which enter the field between grids 21 and 22 are reflected toward plate 24 while the faster electrons penetrate grid 22 and are collected by plate 23. The maximum and minimum velocities of the electrons of beam 3 after emerging from grid 12 depend upon the amplitude of oscillation and upon other conditions in the system, such as the accelerating voltage applied to the electron beam. The current from plate 24 is a function of the flight time of electrons between members 1 and 2. This flight time is a function of the accelerating voltage which is adjusted so that the efficiency of oscillation is not a maximum and so that every change in electron flight time resulting from a change in voltage will result in a change of current through plate 24. The current from plate 24 is passed through a resistor 26 thereby developing a voltage thereacross which is caused to control a voltage amplifier 27 of ordinary triode form. This amplifier may have any desired amplification and it may be of any of several forms already known in the art.

Amplifier 27 produces variations in voltage across a resistor 28. The voltage variations across resistor 28 are available for compensating factors which cause variations in electron beam flight time. Inasmuch, as the voltage on resistor 28 is produced by variation of electron velocity within the apparatus, the compensation arrangement using this voltage is referred to as internally excited. The voltage across resistor 28 is impressed on conducting tube 18 which controls to some extent the average time of flight of electrons moving from resonant member 1 to resonant member 2. If the voltage amplification of amplifier 27 is high, a small change in voltage across resistor 26 will produce a comparatively large change in voltage on tube 18, and as a result the variation of electron flight time is allowed to change but little.

A somewhat simpler and more direct method of stabilization of electron flight time is accomplished by impressing on tube 18 a variable voltage which is proportional to the fluctuations in the voltage of the power supply, and of such magnitude as to cause a change of flight time through tube 18 which is equal and opposite to the change in flight time between members 1 and 2 that would be caused by fluctuation of the voltage of the power supply if no compensating voltage were impressed on tube 18. In the circuit shown, the voltage change required on tube 18 to compensate a change in power supply voltage is of the same sign and slightly greater than the voltage to be compensated. This voltage change may be conveniently supplied by utilizing a small part of the power supply voltage to control an amplifier the output voltage of which is impressed on tube 18. Such an arrangement may be classified as being externally excited.

In this arrangement for controlling electron beam flight time as determined by external voltage, an amplifier 31 is shown arranged with a resistor 35 in its external circuit, which resistor is connected to tube 18. Amplifier 31 is controlled by voltage across a potentiometer 33 upon which is impressed the beam accelerating voltage produced by a rectifier 34 which derives energy from the power line 7. An increase of line voltage causes the electrons of beam 3 to be more rapidly accelerated from the emitter 4, and to tend to traverse the space from emitter 5 to member 2 in a correspondingly shorter time. For correction, the flight time of the electron in going from member 1 to member 2 is increased by making the potential on tube 18 more negative, or less positive. This is accomplished in the connections shown. If the voltage across potentiometer 33 increases, the grid of amplifier 31 becomes less negative. This causes the plate current of amplifier 31 to increase which increases the voltage drop in the resistor 35 and a consequent decrease of voltage on the plate of amplifier 31 and tube 18. This causes an increase in flight time of electrons through tube 18 from circuit member 1 to circuit member 2. If the amplification in amplifier 31 is made sufficient so that a change in voltage on potentiometer 33 causes a change in voltage on tube 18 of correct magnitude, it is possible to cause the flight time of electrons from member 1 to member 2 to increase when the line voltage increases, or to remain constant as may be preferred.

Electron beam current compensation systems are somewhat similar to the systems just described for voltage compensation. In the internally excited voltage compensation system described above, changes in voltage produced in resistor 26 as a result of changes in electron velocity were used to control the time of flight of electrons through tube 18. In the analagous internally excited current compensation system, a potentiometer 36 is introduced between ground and the junction of connection to detector plates 23 and 24. In this system when operating, the ratio of the current through plate 23 to the current through plate 24 is a function of electron velocity but the total combined current from the two plates is substantially the total current emitted from emitter 4 less losses of electrons at grids 8, 9, 11 and 12 and electrons lost by scattering. The voltage across potentiometer 36 is thus substantially proportional to electron emission from emitter 4. If the electron emission increases, the voltage across potentiometer 36 increases. This variation in voltage is impressed on the grid of an amplifier 37 connected by lead 37' and battery 36' to potentiometer 36 so that increase of voltage on potentiometer 36 causes an increase of plate current in amplifier 37, which increases the voltage drop in a resistor 38 and a corresponding decrease in voltage on the plate of amplifier 37. This plate is connected through a battery 39 to grid 16. A decrease in voltage at the plate of amplifier 37 hence will cause grid 16 to become more negative with respect to emitter 4 and to increase the space charge effect at grid 16. This will cause a decrease in the electron beam current. With high amplification in amplifier 37 a small increase in current in potentiometer 36 will cause a comparatively large voltage variation at grid 16 and thus will restrict the electron current variation to a comparatively small range.

A second internally excited current compensation system is similar to the system just described except that instead of using the voltage in potentiometer 36 produced by the entire electron current in the system, an auxiliary beam sampling electrode 17 is used to produce a voltage in resistor 41. The voltage developed across resistor 41 causes the plate current of an amplifier 42 to increase as a corresponding function. An increase in plate current in amplifier 42 causes the voltage drop across a resistor 43 to increase and this causes grid 16 to become more negative and to impede the flow of electrons from emitter 4 as described before. The use of the resistor 36 connected to detector plates 23 and 24 is usually preferred to the use of the sampling electrode 17 and resistor 41.

A system of current compensation analogous to the externally excited system of voltage compensation also is shown in the drawings. In this system, changes in current resulting from a change in line voltage are cancelled by changes in voltage applied to grid 16 which is of the same sign as the change in power supply voltage and of a magnitude sufficient to cause a change in electron beam current equal and opposite to that which would be caused by the change in line voltage if no compensation were employed. This compensating voltage on grid 16 may conveniently be supplied by an amplifier 44 similar to amplifier 31 described for compensating flight time. The amplifier 44 is connected to potentiometer 33 in the same way as amplifier 31 was connected. An increase in line voltage makes the voltage on the grid of amplifier 44 more positive, or less negative, and this causes the plate current of amplifier 44 to increase. This, through a resistor 45, causes grid 16 to become more negative and to decrease the electron beam current from emitter 4.

In the externally excited voltage and current compensation systems the same amplifier, either amplifier 31 or 44, may be used to impart voltage variations to both grid 16 for beam current control and to tube 18 for flight time control. Suitable circuits for using an amplifier to control two different voltages as required here are known in the existing art. For example, the amplifier may be a multistage, direct current amplifier with the first stage delivering voltage to tube 18 and a second stage delivering voltage to grid 16.

Among the distinctions between the internally and externally excited compensation systems which have been described, it should be especially noticed that the degree of compensation possible in the externally excited system is complete while in the internally excited system complete compensation is not possible, although it may be approached by indefinite increase in amplification. The incompleteness of compensation in the internally excited systems is, however, a disadvantage that is offset by the fact that this form of compensation is not sensitive to changes in gain of the amplifier. It is therefore advantageous to use both forms of compensation in the same device because the changes in operation of the device may be reduced to a small range by externally excited compensation, and then further reduced by internally excited compensation. For economy of parts the same amplifier may be used for externally and internally excited compensations. For example, amplifier 31 may be eliminated and its function performed by amplifier 27. This is accomplished by adding a tap 46 to resistor 26 and connecting tap 46 through a resistor to the positive terminal of rectifier 34. This connection is completed in the drawings through a switch 46'. By opening a switch 31' and closing switch 46', this action is obtained in the apparatus illustrated in the drawings. With this arrangement, the grid of amplifier 27 is controlled by a combination of voltage from rectifier 34 and resistor 26.

In the internally excited voltage compensating arrangement, in which the potential difference across resistor 26 is used, this potential difference should be dependent solely on electron velocity and not on electron beam current. If the voltage across resistor 26 is also a function of electron beam current, undesired changes in flight time will be introduced as a result of changes in electron beam current. This is avoided by proper adjustment of the beam voltage and detector bias voltage. For small changes in electron velocity and beam current, the voltage across resistor 26 can be made substantially a function of electron velocity only.

Up to the present, two arrangements for compensating for the effect of voltage variation and three arrangements of compensating for the effects of electron beam current variation have been shown. All of these arrangements depend either on the control of electron flight time in part of the system or on the control of electron beam emission. The several arrangements shown are alternative methods of effecting the two types of control. The arrangements for controlling the electron flight time shown are applicable particularly to the "klystron" arrangements using two hollow resonators or resonant circuit members as shown in Fig. 1. The methods of current control shown in this figure are applicable to all "klystron" forms inasmuch as all of them have an emitted electron beam.

In Fig. 2, a single hollow resonator or resonant circuit member 1' performs both bunching and catching operations. An electron beam 3' from an emitter 4' is projected through circuit member 1' into an electric field between grid 9' and a plate 52 by which the electrons are reflected back into member 1. Plate 52 is insulated by insulator seal 53. A difference of potential between grid 9' and plate 52 is maintained by a rectifier 34' or by a battery 54 or by both. If both the rectifier 34' and battery 54 are used, a potentiometer 55 is used for connection between them. Rectifier 34' also supplies accelerating voltage for beam 3' as in Fig. 1.

Instead of the simple type of thermally heated emitter 4 with the filament 5 shown in Fig. 1, a novel form of emitter especially adapted to furnishing a stable electron beam current is used. In this novel arrangement, the electron emission is from a heated plate 61, such as a tantalum plate which is heated by electron bombardment. The electrons for bombardment are emitted by a heated member 62 which may be a filament of suitable form heated by transformer 6'. A guard ring 63 is provided for control of the field between the surfaces of members 61 and 62. A rectifier 64 receiving energy from line 7 supplies energy for accelerating the electrons from the surface of member 62 to plate 61. The rectifier, insofar as the direct current output is concerned, is considered to have a known fixed resistance. The circuit through rectifier 64 and members 61 and 62 is completed through a ballast resistor 65. When using this arrangement, there are two desirable modes of operation. Firstly, the resistance of rectifier 64 and ballast resistor 65 can be made of such value that small changes in operating characteristics of emitter 61 resulting in small changes in inter-electrode resistance between members 62 and 61 will not affect the power delivered by the bombarding electrons to member 61. Secondly, if the emission characteristics of the emitter are moderately stable, it is possible to make the power delivered to 61 substantially independent of small changes in line voltage.

Resistor 65 may be made of such value that the sum of its resistance plus the resistance of the rectifier 64 is substantially equal to the resistance of the space between the surface of members 61 and 62. It is well known in the theory of circuits that maximum rate of energy transfer, from a source of direct current having fixed resistance and constant total generated voltage to an external resistance, occurs when the external resistance is equal to the resistance of the current source. This principle is applicable here. If the entire resistance of the rectifier 64 plus the resistance of resistor 65 is made equal to the resistance between the surfaces of members 61 and 62, there will exist the condition for maximum rate of transfer of energy from rectifier 64 to plate 61. Then anything that causes a change in resistance between the surfaces of members 62 and 61 will reduce the rate of energy transferred to plate 61 from the maximum value. Under these conditions the rate of change of power between surfaces of members 61 and 62 will be small for small departures of resistance from the optimum value. This may be seen qualitatively by noticing that any change in electron current is accompanied by a corresponding change in opposite sense of space resistance so that with resistor 65 having the value above indicated, the total kinetic energy of the electrons moving from member 62 to member 61 is a constant, whereby it follows that the electrons emitted at any instant possess kinetic energy per electron in substantially inverse proportion to the total number of electrons. Compared with the operation of an ordinary directly heated emitter it will be seen that the bombardment heated emitter is operated normally on the "flat" part of the power characteristic, whereas the usual arrangement operates on the steep part of the characteristic.

In the second mode of operation mentioned above, resistor 65 is made somewhat larger than in the previous instance so that an increase in resistance between 62 and 61 will result in an increase of power delivered to 61. The filament 62 is heated from the same source that supplies the voltage between 61 and 62, so that fluctuations in filament voltage are proportional to fluctuations of line voltage. Then an increase in filament voltage results in a decrease in resistance between 62 and 61 and vice versa. This if acting alone would result in a decrease in power supplied to 62, when the filament voltage increased, but since the increase in line voltage tends to increase the power delivered, the two effects may be made to compensate each other. It is not possible to fully satisfy both the first and second conditions of operation at once, but it is possible to satisfy one and have the other substantially satisfied.

In the structure of Fig. 1, the arrangements shown compensated for the effects of voltage variation by controlling the flight time of electrons from the bunching circuit member 1 to catching circuit member 2. In Fig. 2 a similar effect is accomplished by changing the flight time of electrons in their course from the combination bunching and catching resonant circuit member 1' back toward member 1'. In the operation of this reflex "klystron," electrons projected through the member 1' from the emitter 61 are alternately accelerated and decelerated at the frequency of the system. The electrons leaving grid 9' have varying velocities, some velocities being higher and some being lower than the average velocity of the electrons in the emitted beam, due to the bunching action of member 1'. Plate 52 is charged negatively with respect to grid 9', the difference of potential between plate 52 and grid 9' being somewhat greater than that between plate 61 and grid 68. Consequently, any electron that enters the space between grid 9' and plate 52 is repelled by plate 52 and attracted toward grid 9'. Hence if the difference of potential between plate 52 and grid 9' is greater than that corresponding to the velocity of the electron when it emerges from grid 9', the electron will be stopped in its flight toward plate 52 and will be thrown back through grid 9'.

During the flight from grid 9' to plate 52 the electron is subjected to uniform acceleration toward grid 9' in a way analagous to the uniform acceleration of gravity on a ball thrown from the earth. Since the acceleration is uniform, the time required to stop the electron in its flight is proportional to its velocity. Thus, an electron emerging from grid 9' will be returned to grid 9' in a length of time inversely proportional to its velocity at the time of leaving grid 9'. Accordingly, slow electrons leaving grid 9' later than some fast electrons will arrive back and reenter grid 9' at the same time as these fast ones. The result will be electron bunching.

For stabilizing the frequency of the oscillator shown in Fig. 2 it is desirable to hold the average time of flight of the electrons moving from grid 9' toward plate 52 and back to grid 9' constant. This can be accomplished by adjusting the voltage of battery 54 and the voltage impressed in series with battery 54 by potentiometer 55 so they are approximately equal. This may be shown by the following mathematical analysis.

The electrons emerge from grid 9' with a velocity $v$. The velocity $v$ is given by $$\frac{mv^2}{2} = eV_g \text{ or } v = \sqrt{\frac{2eV_g}{m}}$$

where $m$ is the mass of the electron, $e$ is the charge of the electron, and $V_g$ is the accelerating voltage supplied by rectifier 34'.

Designating the distance from grid 9' toward plate 52 by positive values of $x$, with grid 9 at $x=0$, the motion of the electron between grid 9 and plate 52 is described by $$x = vt + \frac{eV_a}{mD}\frac{t^2}{2}$$

where $D$ is the distance from grid 9' to plate 52, and $V_a$ is the voltage between grid 9' and plate 52. Inasmuch as $V_a$ opposes the motion of the electrons in their motion as imparted thereto by $V_g$, $V_a$ is considered negative, and $$\frac{eV_a}{mD}$$

is a deceleration. The electron emerging from grid 9 at time $t=0$ reenters grid 9 at time $$t = -\frac{2mDv}{eV_a}$$

this being the second value of $t$ for which $x=0$.

In the connections of the battery 54 and the potentiometer 55 it can be seen that $$V_a = V_a^\circ + \delta V_g,$$

where $$V_a^\circ$$

is the voltage of the battery 54 and $\delta V_g$ is the fraction of $V_g$, the voltage of rectifier 34', taken from the potentiometer 55 and added to the voltage $$V_a^\circ$$

of battery 54.

Therefore, inserting the value of $v\delta V_a$ $$t = -\frac{2mD}{c}\frac{\sqrt{\frac{2eV_g}{m}}}{V_a^\circ + \delta V_g}$$

or $$t = \text{constant} \frac{\sqrt{V_g}}{V_a^\circ + \delta V_g}$$

Now suppose $V_g$ fluctuates above and below the average value $$\overline{V_g}$$

by amounts small in comparison with $$\overline{V_g}$$

In order that these fluctuations may have only second or higher order effects on $t$ rather than first order effects, $\delta V_g$ is adjusted so that $$\frac{dt}{d\overline{V_g}} = 0$$

in other words so that the time $t$ does not change with variation of $V_g$.

Then $$\frac{dt}{d\overline{V_g}} = \frac{\frac{1}{2}V_g^{-\frac{1}{2}}(V_a^\circ + \delta V_g)\frac{\delta \overline{V_g}}{\overline{V_g}} - \sqrt{V_g}}{(V_a^\circ + \delta V_g)^2} = 0$$

or $$\frac{1}{2}(V_a^\circ + \delta \overline{V_g}) - o\overline{V_g} = 0$$

and $$V_a^\circ = \delta \overline{V_g}$$

That is, since $$V_a = V_a^\circ + \delta \overline{V_g},$$

constant time of flight is attained if half the voltage between grid 9 and plate 52 is supplied by battery 54 and half by the potentiometer 55.

With this arrangement the effects of variation of line voltage on the bunching time of the electrons in beam 3' are nullified. This arrangement combined with one of the current stabilizing arrangements described with reference to Fig. 1, with either of the two types of electron emitter shown in the drawings, provide means for operating the reflex "klystron" with satisfactory stability. Inasmuch as the details of the current stabilization arrangements shown in Fig. 1 are obviously applicable without material alteration to Fig. 2, they have been omitted from Fig. 2 for convenience and clearness.

The portions of the structures of Figs. 1 and 2 through which the electron beam passes are suitably evacuated as by enclosing the beam path in an evacuated container as disclosed, for example, in application Ser. No. 218,064.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In apparatus of the kind described, the combination of an oscillator comprising cavity resonator means, an emitter for producing an electron flow through said cavity resonator means, means for detecting changes in the velocity of electrons flowing from said emitter, and means for utilizing the output of said detecting means to reduce said changes in velocity.

2. In apparatus of the kind described, the combination of means for producing an electron stream, means for effecting grouping of electrons in said stream, means spaced therefrom for absorbing energy from the grouped electrons, means positioned to act upon the stream after the same leaves the energy absorbing means for detecting changes of time of flight of the electrons in the stream in their passage between the grouping means and the energy absorption means, means for producing an auxiliary voltage having a functional relationship to said changes in time of flight, and means for causing said auxiliary voltage to act upon said stream to oppose and restrict said changes in time of flight.

3. In apparatus of the kind described including a thermionic oscillator device employing a hollow resonator, the combination of means for producing a space current in said thermionic device passing within said resonator, means for detecting changes in space current in the oscillator device, means for producing an auxiliary voltage having a functional relationship to said change in current, and means for causing said auxiliary voltage to oppose and restrict said changes in current.

4. In apparatus of the kind described, the combination of an oscillator having cavity resonator means, means for producing an electron stream for passage within said resonator means, means for detecting changes in electron stream accelerating voltage in the apparatus, said last named means producing an auxiliary voltage having a functional relationship to said change in accelerating voltage, and means for causing said auxiliary voltage to introduce effects for compensating said changes in accelerating voltage by controlling and restricting changes in the time of flight of electrons in said electron stream.

5. In apparatus of the kind described, the combination of hollow resonator means, means for producing an electron stream for passage through said resonator means, means for detecting changes of time of flight consumed by the electrons in the stream during their passage through said resonator means, said last named means producing an auxiliary voltage substantially proportionate to said changes in flight time, means for causing said auxiliary voltage to produce a potential in a region through which said electron steam passes, said potential producing means serving to oppose and restrict said changes of time of flight.

6. In apparatus of the kind described, the combination of means for producing an electron stream, means for producing a voltage for accelerating the electrons in said stream, means producing an electric field for reflecting the electrons in said stream, and means for producing changes in said electric field corresponding to changes in said accelerating voltage, said changes in said electric field being so related to the changes in said accelerating voltage that the average length of time required for the electrons to be reflected in said field is substantially constant.

7. In apparatus of the kind described, the combination of means for producing an electron stream, means for producing a voltage for accelerating the electrons in said stream, means producing an electric field for completely reflecting said electron stream, said last named means including a substantially constant voltage source and a source of voltage proportional to the electron accelerating voltage, together with means for combining said two voltages and applying them to establish said reflecting electric field, the ratio of said two voltages being such that the time spent by an electron in said field is substantially independent of changes in the electron accelerating voltage.

8. The method of stabilizing the operating frequency of an electron stream type oscillator having electron bunching and catching means, comprising producing a stream of electrons, bunching said stream of electrons, detecting changes in the applied line voltage, changing the time of flight of said stream in accordance with said detected changes to keep said time of flight constant, and then catching said bunched stream.

9. The method of stabilizing the operating frequency of an oscillator of the type described employing an electron stream, which consists in producing a stream of electrons, congregating the electrons of said stream into bunches, producing changes in voltage corresponding to frequency disturbing changes in external parameters, producing changes in the velocity of electrons of the stream within said oscillator in accordance with said changes in voltage to compensate the effects of said disturbing changes in external parameters, and extracting energy from the bunched stream.

10. Apparatus for producing a uniform flow of thermions, comprising a thermionic emitter of electrons and means for supplying heat to said emitter, said means including an electron emitting source for producing electrons for bombarding said thermionic emitter, a source of electric power for accelerating electrons from said electron emitting source, and a current flow limiting resistor in series with said electron emitting source and said source of electric power, said resistor having sufficient ohmic resistance to cause the electrons emitted at any instant to possess kinetic energy per electron in substantially inverse proportion to the total number of electrons whereby variations in voltage of said power source are automatically compensated.

RUSSELL H. VARIAN.
WILLIAM W. HANSEN.

Certificate of Correction

Patent No. 2,250,511. July 29, 1941.

RUSSELL H. VARIAN ET AL.

It is hereby certified that error appears in the printed specification of the above numbered patent requiring correction as follows: Page 5, second column, lines 31, 32, and 33, for the equation read $$\frac{dt}{dV_s} = \frac{\frac{1}{2}V_s^{-\frac{1}{2}}(V_s^o + \delta V_s)\frac{\delta V_s}{-V_s}\sqrt{V_s}}{(V_s^o + \delta V_s)^2} = 0$$

$$\frac{dt}{dV_s} = \frac{\frac{1}{2}V_s^{-\frac{1}{2}}(V_s^o + \delta V_s) - \frac{\delta V_s}{V_s}\sqrt{V_s}}{(V_s^o + \delta V_s)^2} = 0$$

and that the said Letters Patent should be read with this correction therein that the same may conform to the record of the case in the Patent Office.

Signed and sealed this 1st day of February, A. D. 1944.

[SEAL]

HENRY VAN ARSDALE,
*Acting Commissioner of Patents.*